(12) United States Patent
Alagos et al.

(10) Patent No.: US 9,446,919 B2
(45) Date of Patent: Sep. 20, 2016

(54) PUSH-PULL LATCH ASSEMBLY FOR A DETACHABLE MEDIA PICK MECHANISM

(71) Applicant: Lexmark International, Inc., Lexington, KY (US)

(72) Inventors: Angel Macuha Alagos, Cebu (PH); Generoso Tebordo De La Cerna, Lapu Lapu (PH)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 14/572,935

(22) Filed: Dec. 17, 2014

(65) Prior Publication Data

US 2016/0177989 A1    Jun. 23, 2016

(51) Int. Cl.
*B65H 3/06* (2006.01)
*F16B 7/04* (2006.01)

(52) U.S. Cl.
CPC .............. *B65H 3/0669* (2013.01); *B65H 3/06* (2013.01); *B65H 3/0684* (2013.01); *F16B 7/042* (2013.01); *B65H 2402/5155* (2013.01); *B65H 2402/631* (2013.01); *B65H 2404/1521* (2013.01)

(58) Field of Classification Search
CPC  B65H 3/0669; B65H 3/0676; B65H 3/0684; B65H 2402/31; B65H 2402/33; B65H 2402/512; B65H 2402/51521; B65H 2402/5122; B65H 2402/5155; B65H 2402/61; B65H 2402/62; B65H 2402/63; B65H 2402/631; B65H 2402/632; B65H 2402/64; B65H 2404/1521

USPC .................................................. 271/117, 118
See application file for complete search history.

(56) References Cited

U.S. PATENT DOCUMENTS

| | | | |
|---|---|---|---|
| 5,678,814 A | 10/1997 | Yokoyama | |
| 5,854,695 A | 12/1998 | Cho | |
| 6,382,619 B1 | 5/2002 | Gustafson | |
| 7,300,049 B2 | 11/2007 | Brown | |
| 7,857,301 B2 | 12/2010 | Samoto | |
| 7,905,479 B2 * | 3/2011 | Samoto | B65H 3/0684 271/117 |
| 8,371,572 B2 | 2/2013 | Blair | |
| 9,079,716 B2 * | 7/2015 | Kawashima | B65H 3/06 |
| 9,272,858 B2 * | 3/2016 | Hirose | B65H 3/0669 |
| 9,340,378 B2 * | 5/2016 | Ueyama | B65H 5/06 |
| 2009/0243186 A1 | 10/2009 | Samoto | |

* cited by examiner

*Primary Examiner* — Ernesto Suarez
(74) *Attorney, Agent, or Firm* — John Victor Pezdek

(57) ABSTRACT

A push-pull latch assembly for a detachable media pick mechanism. The latch assembly comprises a handle that is slidably and axially insertable into a handle base which is mounted to the pick mechanism housing. The handle base includes a pair of cantilevered, opposed latched arms having opposed catches for engagement with a groove positioned adjacent to a free end of a cantilevered drive shaft for the pick mechanism. The handle includes triangular rails having inner and outer ramps used to separate the opposed latch arms. The outer ramp separates the latch arms when the handle is inserted into the handle base. The inner ramp separates the latch arms during removal of the pick mechanism from the drive shaft. An axial pushing force engages the latch assembly to the groove and an axial pulling force disengages the latch assembly from the groove allowing for pick assembly removal.

9 Claims, 12 Drawing Sheets

PUSH-PULL LATCH ASSEMBLY FOR A DETACHABLE MEDIA PICK MECHANISM

CROSS REFERENCES TO RELATED APPLICATIONS

None.

REFERENCE TO SEQUENTIAL LISTING, ETC

None.

BACKGROUND

1. Field of the Invention

The field relates generally to pick mechanisms for media input feed systems for an image forming device ("IFD") having a removable input tray, and, in particular, to latching mechanism used with removable pick mechanism.

2. Description of the Related Art

IFDs, such as printers, scanners and photocopiers utilize media feed mechanisms for feeding various types of media sheets into the IFDs. Examples of the various types of media sheets include, but are not limited to, printing paper, bond paper, coated paper, fabrics, transparencies and labels. Almost all of the media feed mechanisms include a pick mechanism having one or more pick wheels for feeding a media sheet into the IFD for further processing. In a media feed mechanism, various arrangements of the pick mechanism may exist for feeding the media sheet into the IFD.

In one such arrangement of a media feed mechanism, the pick wheel may be coupled with other components of the media feed mechanism to exert a normal force on the media sheet. Examples of the other components that may be coupled to the pick wheel include motors, solenoids, cams, pick arms, gears, shafts, and the like. The pick wheel pushes the media sheet into the IFD due to friction between the pick wheels and the media sheet. Herein, pushing the media sheet into the IFD refers to pushing the media sheet in a media process direction into a specific section of the IFD, for example, pushing the media sheet into a 'printing zone' where the IFD is a printer.

Over time the pick wheels wear and require replacement. This is usually done by replacing the pick mechanism. Conventional pick mechanisms are usually mounted over the media in a removable media input tray (RMIT) or over a multipurpose media input tray on one or more steel rods that extend between the sides of the media tray and that require tools and partially disassembly to be removed. With such mounting arrangements, it is difficult to remove or repair the pick mechanism and usually requires the intervention of a skilled technician. Removable pick mechanisms may mounted to a drive shaft extending from one side of a media tray. In such situations, the removable pick mechanism is slid on to the free end of the drive shaft and a latch is engaged with the drive shaft to hold the pick mechanism in place. With this mounting arrangement, the pick mechanism can be more readily removed. One such latch assembly is illustrated in U.S. Pat. No. 8,371,572 B2, entitled "Detachable Reversible Pick Mechanism For Feeding Media From a Media Tray Of An Imaging Forming Device", issued Feb. 12, 2013, and assigned to the assignee of the present disclosure. There, to remove the pick mechanism from its mounting shaft, the latch assembly requires that two latch arms be pinched together and, while being pinched together, slid off the free end of the shaft. The release force there is being applied transversely to the rotation axis of the mounting shaft. One drawback with such a latch is that it is difficult for a user to know when the latch has released from the shaft. Further, because there is usually little free space about the pick mechanism, it may be difficult to reach in a pinch the latch arms together while simultaneously trying to slide the pick mechanism off of the drive shaft. It would be advantageous to have a latch assembly that may be operated to release the pick mechanism from the shaft by applying the release force parallel to mounting shaft and then continuing to slide the pick mechanism off of its mounting shaft. It would also be advantageous to avoid having to apply the latch assembly release force transverse to the removal direction of the pick mechanism.

SUMMARY OF THE INVENTION

A push-pull latch assembly for a detachable pick mechanism for a media input tray is disclosed. The latch assembly comprises a handle base coupled to a handle that is slidably and axially insertable into the handle base. The handle base is coupled to a housing of a detachable pick mechanism. The handle base further includes a pair of opposed flexible latch arms, each having opposed catches for engagement with a groove positioned adjacent to a free end of a cantilevered drive shaft used to drive the pick mechanism. The handle base further includes one or more guide arms for aligning the handle with the handle base during assembly of the latch assembly. The handle includes a support body having at least one triangular rail mounted thereon and having an inner and an outer ramp used to separate the opposed latch arms with each ramp being at an acute angle with respect to the support body. The outer ramp separates the latch arms when the handle is slidably inserted into the handle base. The inner ramp separates the latch arms during removal of the pick mechanism. An axial pushing force engages the latch assembly to the groove and an axial pulling force disengages the latch assembly from the groove allowing the pick assembly to be removed from the drive shaft. A step between the inner and outer ramps helps to retain handle with the handle base during application of the axial pulling force providing tactile feedback when removing the pick mechanism.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

FIG. 13A illustrates a sectional view of an example embodiment of the handle base while FIG. 13B illustrates a sectional view of an example embodiment of the handle of the present latch assembly along with an inset showing details of ramping features.

FIGS. 14A-14B are sectional views illustrating the attachment of the handle of FIGS. 13B to the handle base of FIG. 13A to form an example embodiment of the latch assembly.

FIGS. 15A-15E are sectional views illustrating the attachment and disattachment of the latch assembly onto a drive shaft wherein FIGS. 15A-15C show the attachment while FIGS. 15D-15E show the disattachment.

DETAILED DESCRIPTION

Figure 1:
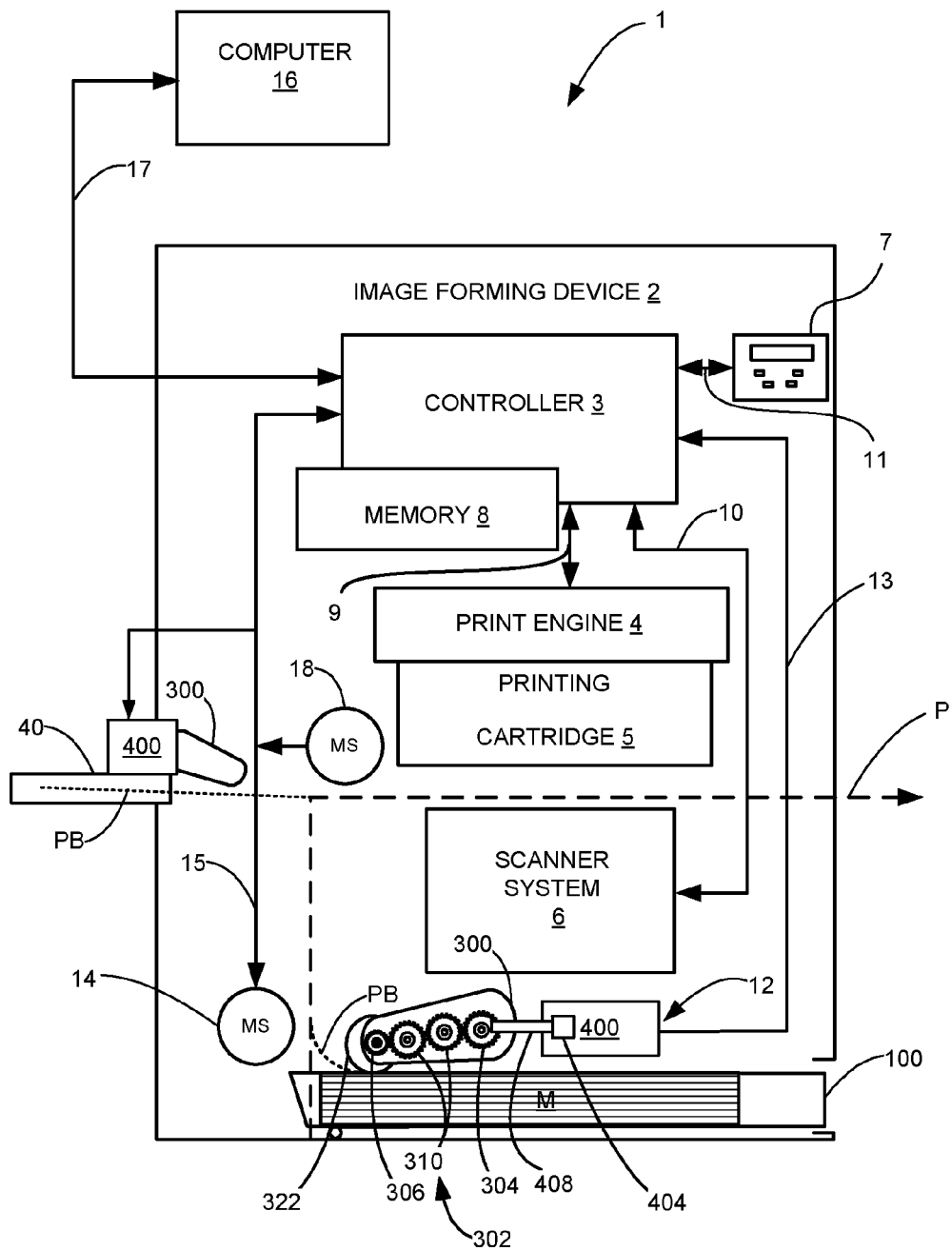
FIG. 1 is a schematic view of an imaging system according to one example embodiment.

It is to be understood that the present application is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this Detailed Description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and other alternative mechanical configurations are possible.

As used herein, the term "communication link" is used to generally refer to structure that facilitates electronic communication between multiple components, and may operate using wired or wireless technology. While several communication links are shown, it is understood that a single communication link may serve the same functions as the multiple communication links that are illustrated. As used herein, the term "media width" refers to the dimension of the media that is transverse to the direction of the media path. The term "media length" refers to the dimension of the media that is aligned to the direction of the media path. The media is said to move along the media path and the media path extensions from an upstream location to a downstream location as it moves from the media input trays to the output area of the IFD. For each media tray, the top of the media tray is downstream from the bottom of the media tray. Conversely, the bottom of the media tray is upstream from the top of the media tray. Further, the media is conveyed using pairs of rollers that form nips therebetween. The term "nip" is used in the conventional sense to refer to a nip formed between two rollers that are located at about the same point in the media path and have a common point of tangency to the media path. With this nip type, the axes of the rollers are parallel to one another and are, typically, but do not have to be, transverse to the media path. For example, a deskewing nip may be at an acute angle to the media feed path. The term "separated nip" refers to a nip formed between two rollers that are located at different points along the media path and have no common point of tangency with the media path. Again the axes of rotation of the rollers having a separated nip are parallel but are offset from one another along the media path. Nip gap refers to the space between two rollers. Nip gaps may be open, where there is an opening between the two rollers, zero where the two rollers are tangentially touching or negative where there is an interference between the two rollers. As used herein, the leading edge of the media is that edge which first enters the media path and the trailing edge of the media is that edge that last enters the media path. Depending on the orientation of the media in the media trays, the leading/trailing edges may be the short edge of the media or the long edge of the media, in that most media is rectangular. Further relative positional terms are used herein. For example, "superior" means that an element is above another element. Conversely "inferior" means that an element is below or beneath another element. "Media process direction" describes the movement of media within the imaging system as is generally meant to be from an input toward an output of an imaging system. The explanations of these terms along with the use of the terms "top", "bottom", "front", "rear", "left", "right", "up" and "down" are made to aid in understanding the spatial relationship of the various components and are not intended to be limiting.

Figure 2:
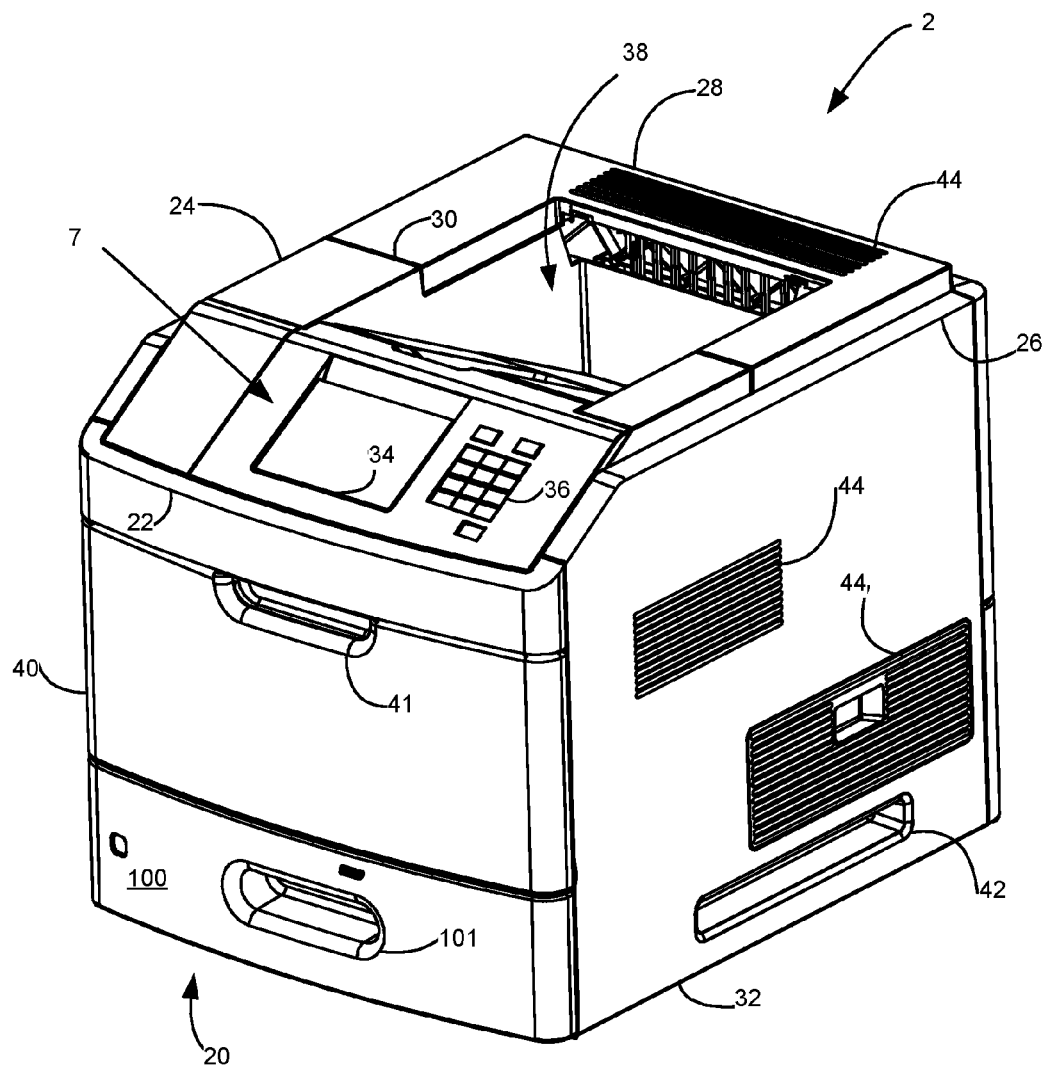
FIG. 2 is an illustration of an image forming device according to one example embodiment.
Figure 3:
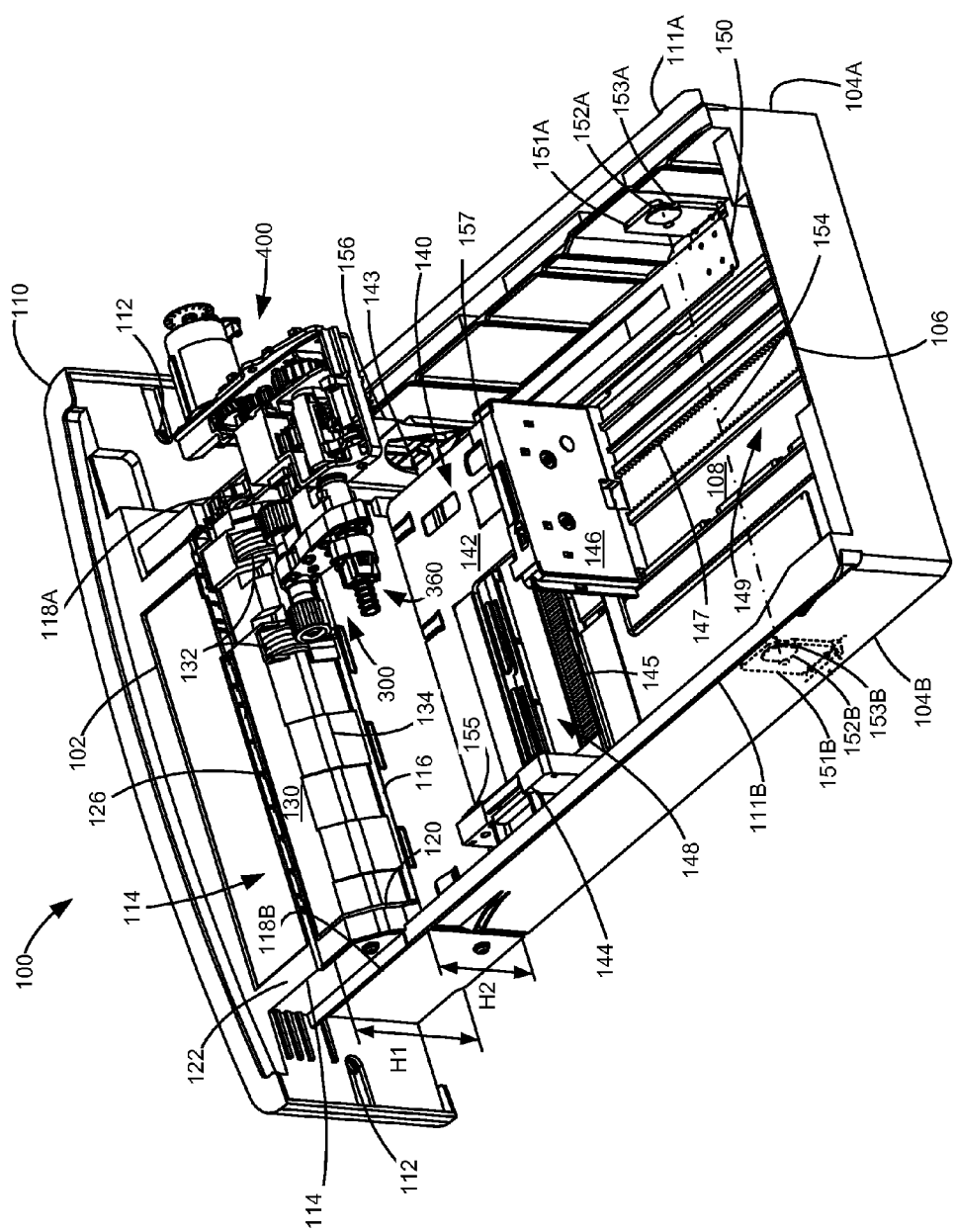
FIG. 3 is an illustration of a RMIT with a detachable pick mechanism and a latch assembly according to one example embodiment.

Referring now to the drawings and, particularly to FIGS. 1-3, there is shown a diagrammatic depiction of an imaging system 1 and RMIT 100. As shown, imaging system 1 may include an image forming device (IFD) 2 and an optional computer 16. IFD 2 is shown as a multifunction machine that includes a controller 3, a print engine 4, a printing cartridge 5, a scanner system 6, and a user interface 7. IFD 2 may also be configured to be a printer without scanning IFD 2 may communicate with computer 16 via a standard communication protocol, such as for example, universal serial bus (USB), Ethernet or IEEE 802.xx. A multifunction machine is also sometimes referred to in the art as an all-in-one (AIO) unit. Those skilled in the art will recognize that IFD 2 may be, for example, an ink jet printer/copier; an electrophotographic printer/copier; a thermal transfer printer/copier; other mechanisms including at least scanner system 6 or a standalone scanner system.

Controller 3 includes a processor unit and associated memory 8, and may be formed as one or more Application Specific Integrated Circuits (ASIC). Memory 8 may be, for example, random access memory (RAM), read only memory (ROM), and/or non-volatile RAM (NVRAM). Alternatively, memory 8 may be in the form of a separate electronic memory (e.g., RAM, ROM, and/or NVRAM), a hard drive, a CD or DVD drive, or any memory device convenient for use with controller 3. Controller 3 may be, for example, a combined printer and scanner controller. In one embodiment, controller 3 communicates with print engine 4 via a communication link 9 Controller 3 communicates with scanner system 6 via communication link 10. User interface 7 is communicatively coupled to controller 3 via communication link 11. Controller 3 serves to process print data and to operate print engine 4 during printing, as well as to operate scanner system 6 and process data obtained via scanner system 6. Controller 3 may also be connected to a computer 16 via communication link 17 where status indications and messages regarding the media and IFD 2 may be displayed and from which operating commands may be received. Computer 16 may be located nearby IFD 2 or remotely connected to IFD 2. In some circumstances, it may be desirable to operate IFD 2 in a standalone mode. In the standalone mode, IFD 2 is capable of functioning without a computer.

IFD 2 also includes a media feed system 12 and RMIT 100 for holding media M to be printed or scanned. Media feed system 12 includes a pick mechanism 300 and drive mechanism 400. Pick mechanism 300 includes a drive transmission consisting of a drive shaft gear 304 at the input end and a pick axle gear 306 at the output end and connected via one of more intermediary gears 310. Pick axle gear 306 is coupled to one or more pick wheels 322 mounted on a pick axle 321 (see FIG. 4). Drive mechanism 400 is operatively coupled to pick mechanism 300 via a drive shaft 408 of motor 404 coupled to drive shaft gear 304. Drive shaft 408 may serve as the mounting shaft for pick mechanism 300. Pick mechanism 300 and drive mechanism 400 are controlled by controller 3 via communication link 13. Another pick mechanism 300 and drive mechanism 400 may be provided adjacent to a multipurpose input tray 40 on media path branch PB that merges with the media path P within IFD 2. Here pick mechanism 300 and drive mechanism 400 are in operable communication with controller 3 via communication link 15.

A media path P (shown in dashed line) is provided from removable media input tray (RMIT) 100 extending through the print engine 4 and scanner system 6 to an output area, to a duplexing path or to various finishing devices. Along the media path P and its extensions PX are provided media sensors 14 which are used to detect the position of the media, usually the leading and trailing edges of the media, as it moves along the media path P. Media sensors 14 positioned along media P and its extension PX are shown in communication with controller 3 via communication link 15.

FIG. 2 illustrates IFD 2 that includes the integrated RMIT 100 that is integrated into a lower portion of the housing 20 of IFD 2. RMIT 100 is provided with a handle 101 used to remove and insert RMIT tray 100 into housing 20. Housing 20 has a front 22, first and second sides 24, 26, rear 28, top 30 and bottom 32. User interface 7 comprising a display 34 and a key panel 36 may be located on the front 22 of housing 20. Using the user interface 7, a user is able to enter commands and generally control the operation of the IFD 2. For example, the user may enter commands to switch modes (e.g., color mode, monochrome mode), view the number of images printed, take the IFD 2 on/off line to perform periodic maintenance, and the like. A media output area 38 is provided in the top 30. A multipurpose media input tray 40 folds out from the front 22 of housing 20 which may be used for handling envelopes, index cards or other media for which only a small number of media will be printed. Hand grips 42 are provided in several locations on housing 20, such as on sides 24, 26, along the top of multipurpose media tray 40, and on the front of RMIT 100. Also various ventilation openings, such as vents 44 are provided at locations on first and second sides 24, 26, and top 30. Downstream of RMIT 100 in IFD 2 a media sensor 18 is positioned along the media path P to sense the presence of, as well as the leading and trailing edges of media being fed from RMIT 100 within IFD 2 (See FIG. 1).

Media sheets M are introduced from RMIT 100 and moved along a media path P during the image formation process. RMIT 100 is sized to contain a stack of media sheets M that will receive color and/or monochrome images. Each IFD 2 may include one or more input options for introducing the media sheets. As illustrated RMIT 100 is sized to hold approximately 550 pages of 20 pound media which has a media stack height of about 59 mm. With this media height, RMIT 100 would be considered to be full. If additional media were added, RMIT 100 would be considered to be overfilled.

Referring to FIG. 3, RMIT 100 has a front wall 102, side walls 104A, 104B, a rear wall 106, and a bottom 108. Attached to the front of front wall 102 is panel 110 having handle 101 therein (see FIG. 2). Panel 110 is illustrated as being attached to front wall 102 by fasteners 112. Front wall 102 may be further defined by front portion 114 having a height H1, a back portion 116 spaced apart from front portion 114 and having a height H2 that is less than height H1, with side portions 118A, 118B adjacent side walls 104A, 104B, respectively, connecting front and rear portions 114 and 116 defining a cavity 120, and a top portion 122. In one embodiment, a removable media dam assembly 130 is received into cavity 120 and is attached to a mount provided in front wall 102 and contains, in some embodiments, a pair of spaced apart separator rollers 132 projecting through corresponding openings in media dam 130. In other embodiments, a sloped media dam extends from the top of rear portion 116 to the top portion 122 of front wall 102 and between side portions 118A, 118B of front wall 102 and may be molded into the front wall 102. In either of these embodiments a media contact surface 134 forms an obtuse angle with the bottom 108. Also the combination of rear portion 116 and media contact surface 134 may be referred to as a media dam having a vertical portion (rear portion 116) and an angled or sloped portion (media contact surface 134). In front of a media dam, such as removable media dam 130, a channel 126 is provided to allow for media M to pass through RMIT 100 from an inferior unit to a superior unit.

Rearward of front wall 102 is media storage location 140 for media to be fed to IFD 2 and is generally defined by front wall 102 and side walls 104A, 104B and bottom 108. As illustrated, rear wall 106 encloses media storage location 140. Alternate embodiments of RMIT 100 may not include a rear wall 106. Media storage location 140 may be open or enclosed. Within media storage location 140 are side and rear media restraints 144, 146, lift plate 142, and lift arm 143. Media M to be fed is placed on lift plate 142 which is positioned between side walls 104A, 104B and is dimensioned to hold the widest media for which RMIT 100 is designed to hold. As illustrated, the length of lift plate 142 is shorter than the length of the longest media for which RMIT is designed in that most media have a modicum of pliability. Example media sizes include but are not limited to A6, 8½"×11", A4, and 11"×17". Lift arm 143 is positioned beneath lift plate 142 and is connected to drive mechanism 400. Lift arm 143 extends through side wall 104A toward side wall 104B and is used to elevate lift plate 142 and media M up to pick mechanism 300 for feeding into media path P. Openings 148, 149 are provided in lift plate 142 to accommodate the adjustment of side and rear media restraints 144, 146, which are slidably attached to bottom 108, while allowing lift plate 142 to be raised or lowered. Provided near the rear end 150 of the lift plate 142 are a pair of opposed pivot arms 151A, 151B that extend vertically upward from the lift plate 142 parallel to side walls 104A, 104B, respectively. Openings 153A, 153B are provided adjacent the upper ends of pivot arms 151A, 151, respectively, which are received on corresponding bearing posts 152A, 152B provided on side walls 104A, 104B, respectively. The use of the pivot arms 151A, 151B raises a pivot axis 154 of lift plate 142 from the bottom 108 to about the centerline of bearing posts 152A, 152B, a distance of about 30 mm. When media storage location 140 is at capacity, this places the leading edge of the top-most media proximate the top of rear portion 116. The location of pivot axis 154 may be designed such that it would be approximately at the mid-point of the rated capacity for the RMIT 100. For example, if a filled RMIT 100 is designed to hold a media stack of about 50 mm in height then pivot axis 154 would be located at about 25 mm from the top surface of lift plate 142. Raising pivot axis 154 of lift plate 142 reduces the amount of fanning or shingling that occurs in the leading edges of media M as it is raised up to pick mechanism 300 for feeding and provides near straight-line motion of the leading edges of the media M. This in turn helps to reduce uncertainty in locating the leading edge of the media M during media feeding.

Media restraints 144, 146 are adjustable and lockable within tracks 145, 147 provided in bottom 108 to accommodate various lengths and widths of media in RMIT 100. Track 147 allows rear media restraint 146 to move from a distal position near rear wall 106 to a proximal position approximately midway along side walls 104A, 104B. Track 145 allows side media restraint 144 to laterally move from a position adjacent side wall 104B to a position approximately 80 mm from side wall 104A. This allows RMIT 100 to hold a narrow compressible media such as envelopes for feeding. Side media restraint 144 has at least one vertically extending media biasing member 155 to bias a topmost portion of the media toward a side wall 104A for aligning media to the media path P and media edge reference surface 156. Biasing member 155 may extend the height of side media restraint 144 or may extend only a portion of its height. Rear media restraint 170 has a spring-bias angled plate 157 that abuts the trailing edges of the media and angles or rotates outwardly from the bottom of rear media restraint 146 while pivoting about an axis near the top of angled plate 157. Angled plate 157 helps to reduce fanning or shingling of the leading edges of media M as it is elevated into picking position within housing 20 by applying greater biasing on the lower portion of the media to the media process direction than at the top of angled plate 157. Guide rails 111A, 111B are also provided on the side walls 104A, 104B, respectively, to assist with insertion and removal of RMIT 100 from housing 20. Also shown in FIG. 3 are pick mechanism 300 having latch assembly 360 and drive mechanism 400 and their relations to RMIT 100 when installed in housing 20. As illustrated, pick mechanism 300 is connected to and supported by drive mechanism 400. Other mounting configurations may also be used.

Figure 4:
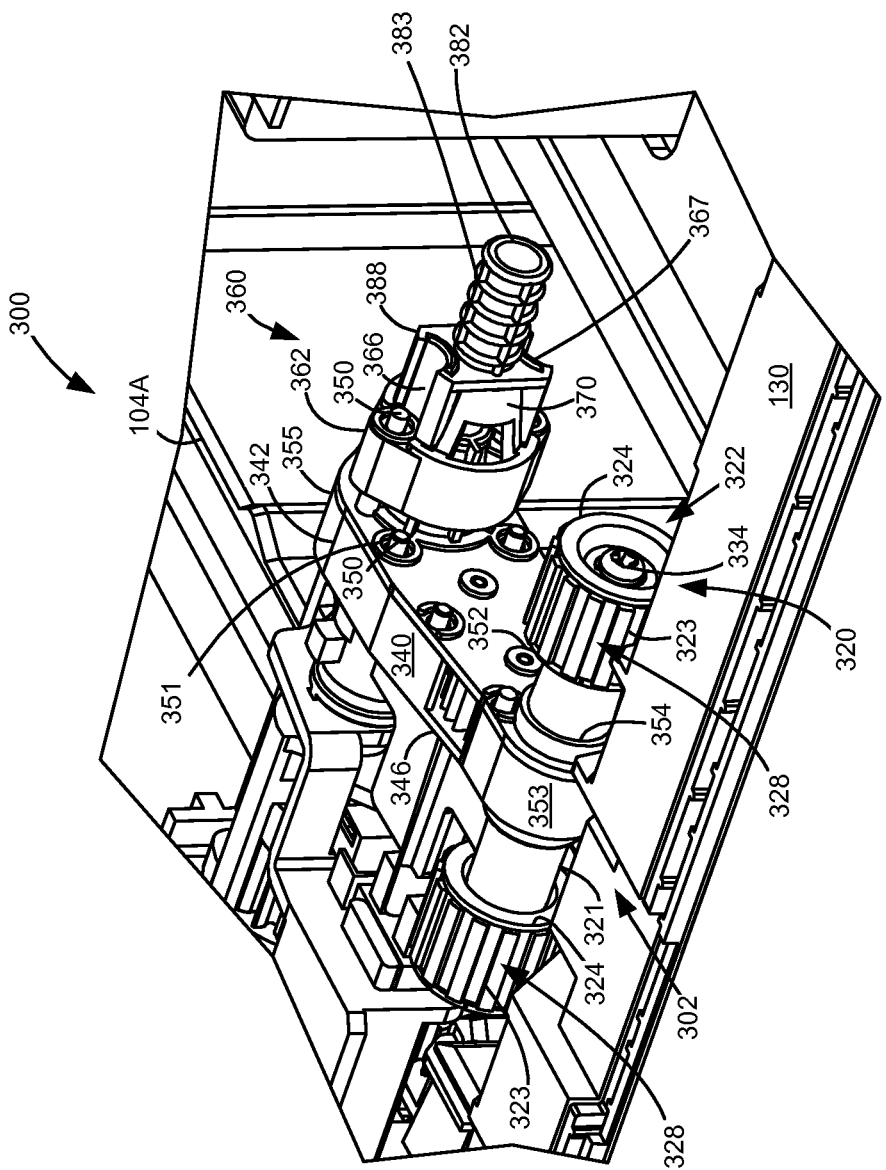
FIG. 4 is a partially enlarged perspective view of the detachable pick mechanism and the latch assembly shown in FIG. 3.
Figure 5:
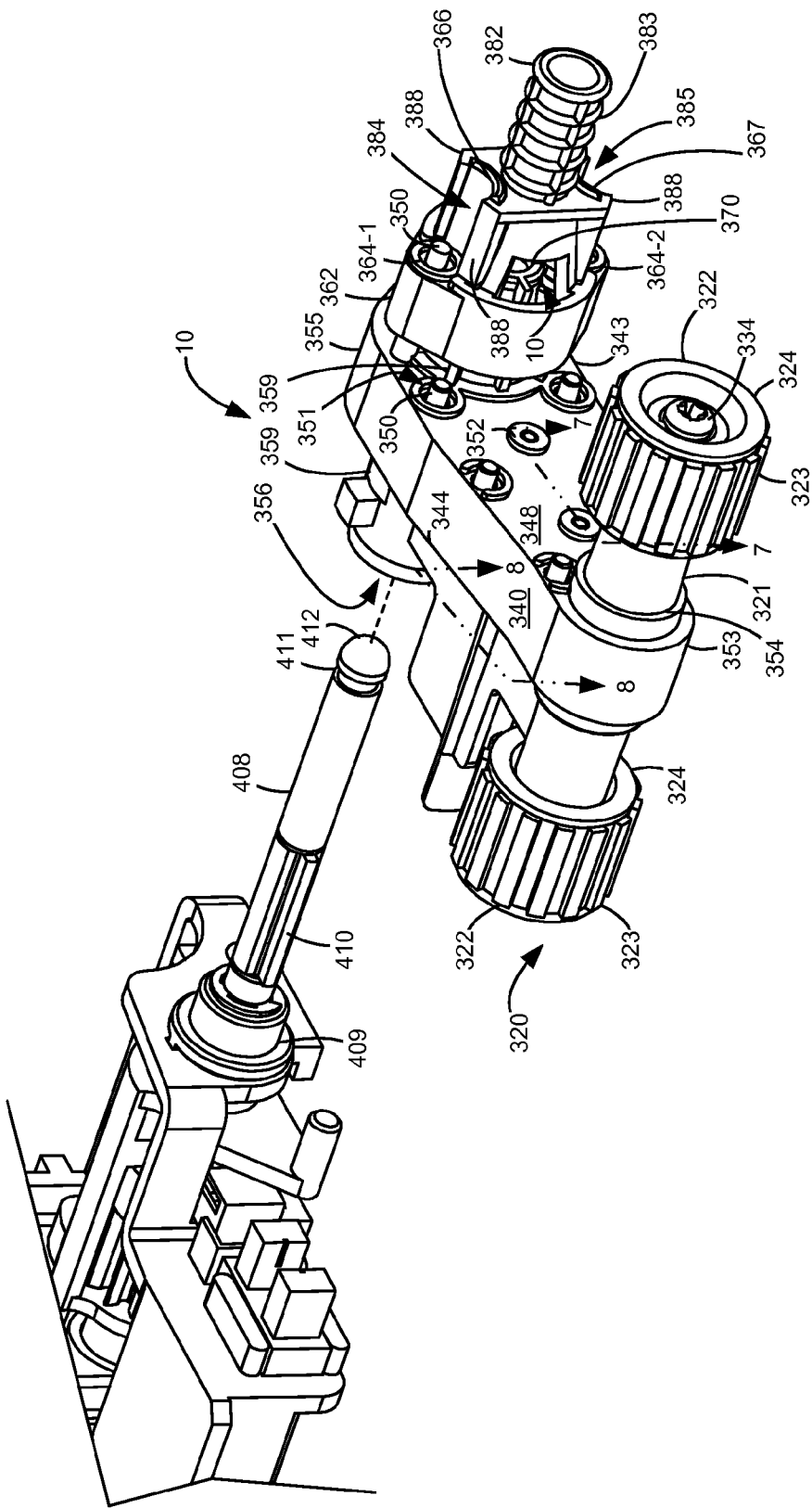
FIG. 5 is an illustration of the detachable pick mechanism and the latch assembly removed from the mounting shaft.
Figure 6:
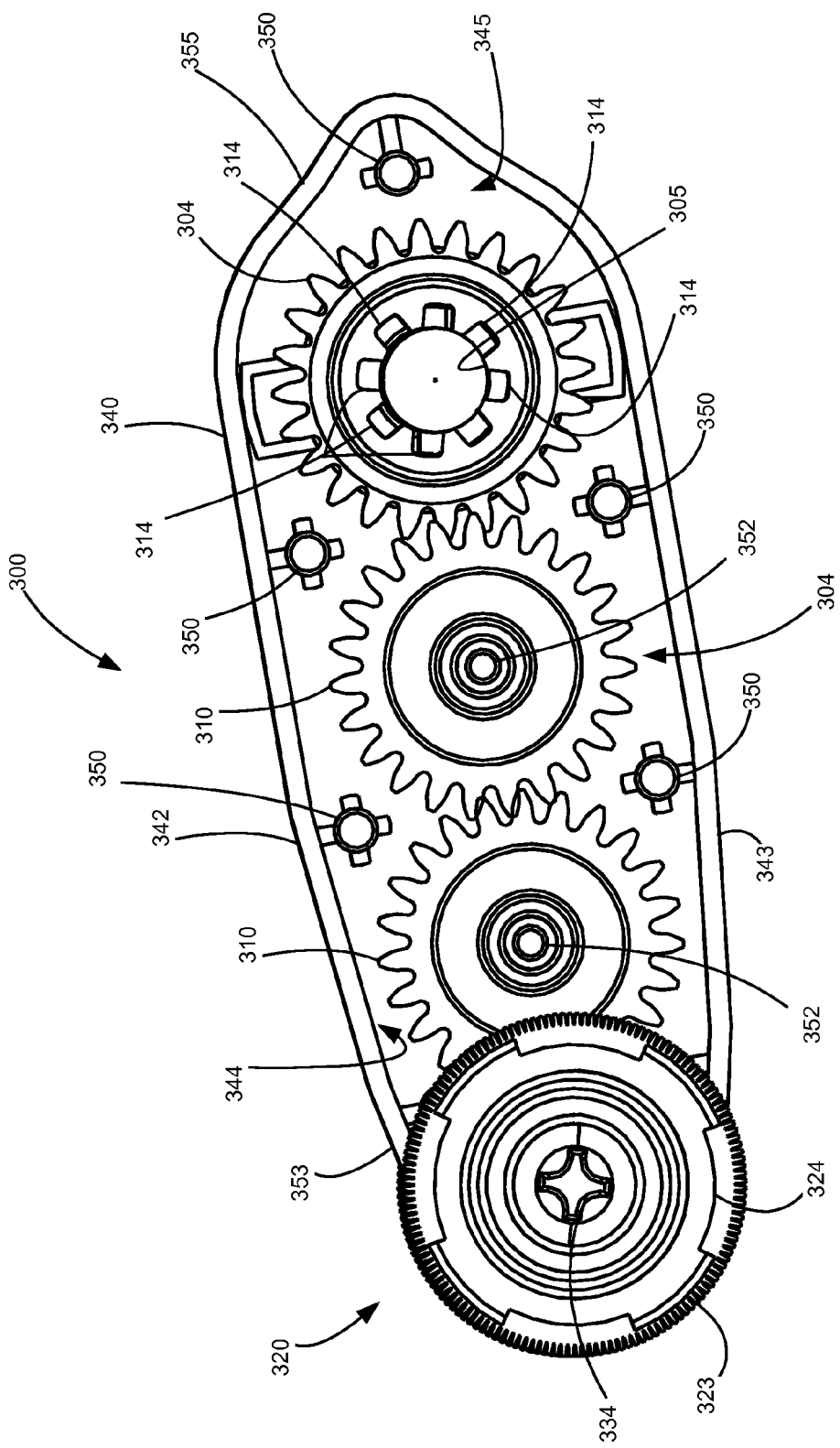
FIG. 6 is an illustration of one example drive transmission for the detachable pick mechanism of FIG. 3.
Figure 8:
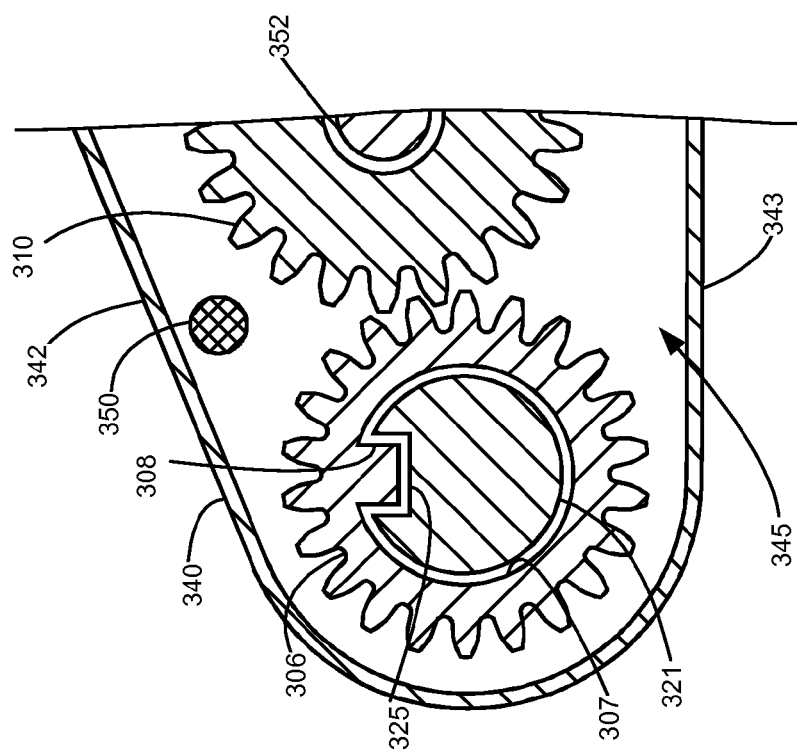
FIGS. 7 and 8 are sectional views of the pick axle assembly shown in FIG. 5 taken along line 7-7 through a pick wheel and along line 8-8 through a front portion of transmission housing.
Figure 7:
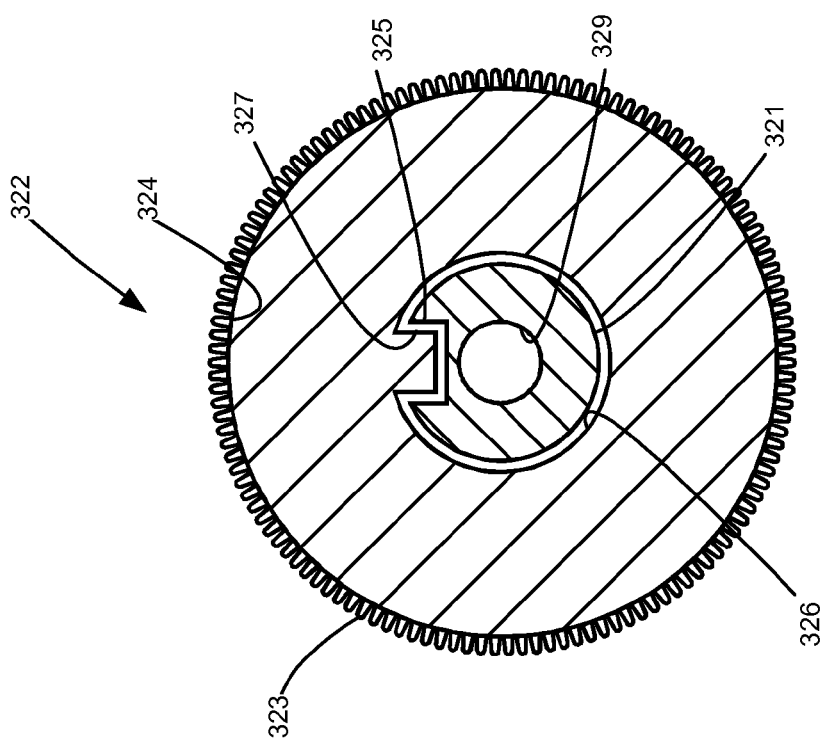

Referring to FIGS. 3-8 pick mechanism 300 is shown in further detail. FIGS. 3-5 show pick mechanism 300 removably mounted to drive mechanism 400 on pick drive shaft 408 which is a cantilevered shaft having a free end 412, that, in one form, is a rounded or semi-hemispherical camming surface. As illustrated, pick mechanism 300 comprises a drive transmission 302, a pick axle assembly 320 and a transmission housing 340 for drive transmission 302. Pick mechanism 300 is detachably mountable on drive shaft 408. The terms such as top, bottom, front and rear of pick mechanism 300 are dependent on its orientation. As used in this description of pick mechanism 300, the terms top, bottom, front and rear refer to the orientation of pick mechanism 300 as illustrated in FIGS. 3-9.

Figure 9:
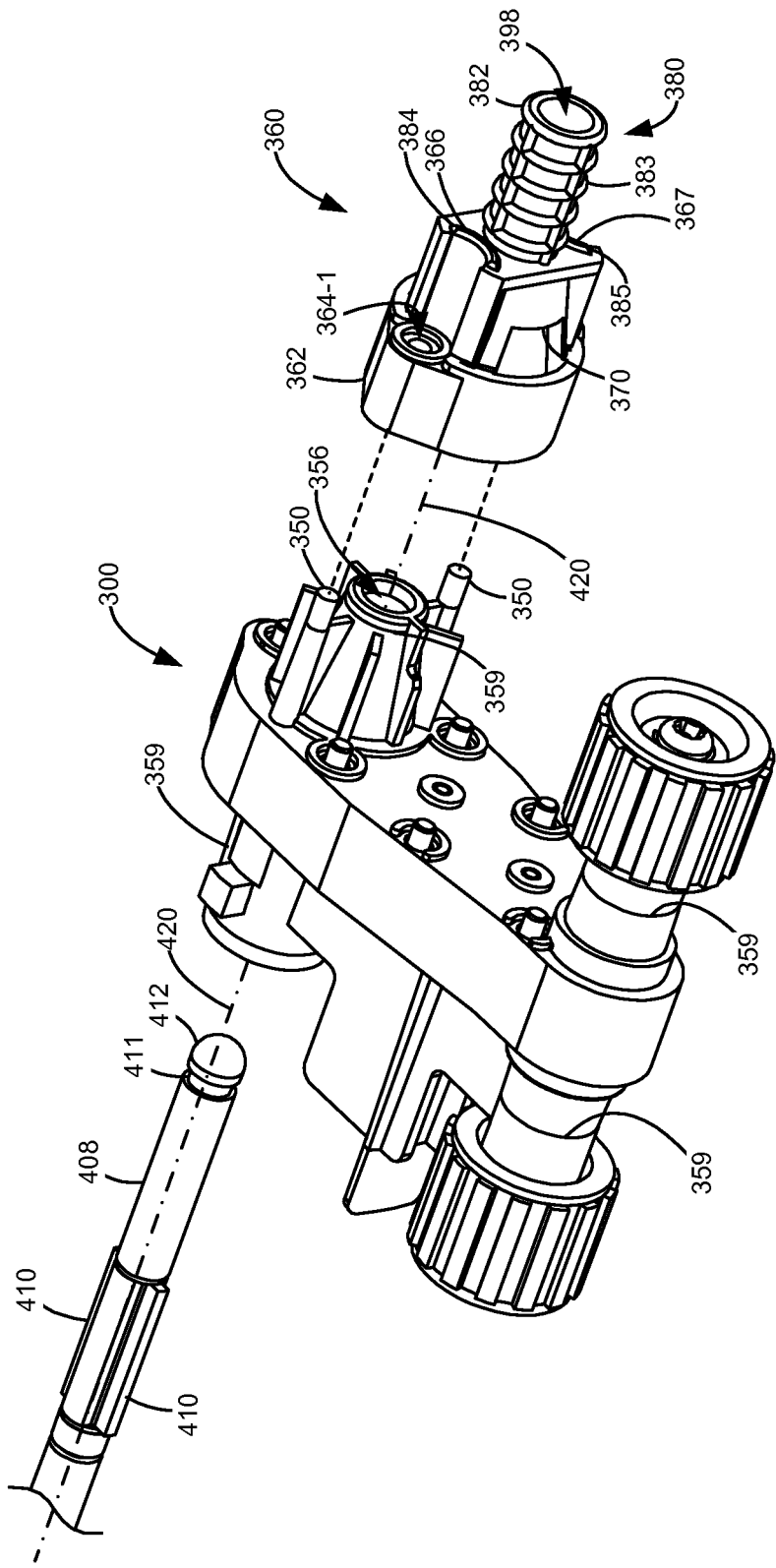
FIG. 9 is an exploded view of the drive shaft, detachable pick assembly, and latch assembly shown in FIG. 5.

Drive transmission 304 comprises a drive shaft gear 304 operatively connected to a pick axle gear 306 via one or more optional intermediary gears 310. Drive shaft gear 304 slidably engages via center opening 307 with cantilevered drive shaft 408 extending from drive mechanism 400 mounted on housing 20 of IFD 2. Center opening 307 has a plurality of axial grooves 314 about its circumference. Drive shaft 408 may be provided with at least one spline 410 radially extending therefrom and along a portion of the length of drive shaft 408. As shown in FIG. 9, two diametrically opposed splines 410 may be provided. Axial grooves 314 engage with splines 410 to transfer torque from the drive mechanism 400 to pick mechanism 300 which rotates pick axle assembly 320 and rotates pick mechanism 300 downward onto the topmost media in media storage location 140. The plurality of axial grooves 314 allow a user to more easily and more quickly install pick mechanism 300 onto drive shaft 408 in the desired orientation than a pick assembly having axial grooves that match the number of splines 410 provided. The use of splines 410 and axial grooves 314 allow for more support surface and drive contact surface between drive shaft 408 and drive shaft gear 304 of pick assembly 300. Pick axle gear 306 has a center opening 307 having a key 308.

In pick axle assembly 320, pick axle 321 has a pick wheel 322 mounted at each end; however other configurations of pick wheels may also be used, for example a single pick wheel or three pick wheels may be mounted on pick axle 321. As illustrated, pick wheels 322 are attached using fasteners, such as screws 334. As one of skill in the art would recognize, other forms of attachment of pick wheels 322 to pick axle 321 may be used. Each pick wheel 322 is comprised of a drum or hub 324 having a pick tire 323 mounted thereon. Should pick mechanism 300 be configured to be reversible (as illustrated), each pick tire 323 has bi-directional treads 328 to provide substantially the same gripping force in either rotational direction. Drums 324 are mounted onto pick axle 321 via openings 326 provided therein using fasteners 334 axially threaded into holes 329 at each end of pick axle 321. As one of skill in the art would recognize, other forms of attachment of pick wheels 322 to pick axle 321 may be used, such as for example, a snap-on type fitting. As illustrated, pick axle 321 has a keyway 325 extending axially along its length. Drums 324 each have a key 327 extending into opening 326. Pick axle gear 306 has a center opening 307 having a key 308 extending into opening 307. Keys 327 of drums 324 and key 308 of pick axle gear 306 engage keyway 325. The keys/keyway allow pick axle 321 and pick wheels 322 to be rotated when pick axle gear 306 is rotated. Keyways may be provided on drums 324 and pick axle gear 306 and a key may be used on pick axle 321. In operation, when drive shaft 408 is rotated, torque is transferred to drive shaft gear 304 then to pick axle gear 306 via intermediary gears 310 and then to pick axle 321 which drives pick wheels 322.

Drive transmission 302 and pick axle 321 are mounted in transmission housing 340 having a top 342, a bottom 343, and a side 344 forming a cavity 345 in which gears 304, 306, 310 are housed. Intermediary gears 310 are mounted on bearing surfaces 352 provided on side 344 in cavity 345. Also within cavity 345 a plurality of heat stakes 350 are formed on side 344 about the periphery of cavity 345 and project outwardly beyond transmission housing 340. In one form heats stakes 350 are plastic rods. A side plate 348 is used to enclose cavity 347. Side plate 348 has a plurality of openings 351 therethrough that correspond to the plurality of heat stakes 350. Heat stakes 350 are inserted into openings 351 and side plate 348 is slid into position to enclosed cavity 345. A heating element is used to melt the portions of heat stakes 350 that extend beyond side plate 348 thus sealing side plate 348 to transmission housing 340. As shown in the figures, heat stakes 350 are illustrated in an unmelted state. When melted, the exterior ends of heat stakes 350 would appear flattened similar to bearing surfaces 352. As known in the art, other forms of fastening side plate 348 to transmission housing 340 may also be used. Heat stakes 350 provide fastening force similar to screws or rivets but occupy less space within transmission housing 340. Not all heat stakes 350 and openings 351 are labeled for purposes of clarity.

A front portion 353 of transmission housing 340 has a front opening 354 extending therethrough through which pick axle 321 is mounted. The height of front portion 353 is less than the diameter of pick wheels 322, i.e. the treads 328 of pick tires 323 that extend beyond top and bottom of the front portion 353. As shown, front portion 353 tapers downwardly from top 342 and upwardly from bottom 343. In one form, transmission housing 340 is approximately 70 mm in length, about 25 mm in height, and about 12 mm in depth; pick axle 321 is approximately 65 mm in length with a diameter of about 5 mm; drum 330 is about 16 mm in diameter and about 15 mm in width; pick wheel 322 has a diameter of about 20 mm including pick tire 323. The height of front portion 353 at its highest is about 18 mm. A rear portion 355 of transmission housing 340 has a rear opening 356 extending therethrough through which drive shaft 408 passes to extend past side plate 348. Additional sleeves 359 may be provided on the exterior portions of side 344 and side plate 348 centered over front and rear openings 354, 356. Sleeves 359 on front portion 353 may be used to provide axial positioning for pick wheels 322 (see FIG. 9). Sleeve 359 extending axially from side plate 348 may be used for mounting latch assembly 360 to transmission housing 340.

Because pick mechanism 300 is easily removable from drive shaft 408 using latch assembly 360, it can be replaced by a user rather than a trained technician. As illustrated in FIG. 9 latch assembly 360 is mounted on the exterior of side plate 348. Latch assembly 360 comprises a handle base 362 and a handle 380. Handle base 362 and handle 380 have respective openings 363, 398 centered about the rotational axis or centerline of drive shaft 408. When pick mechanism 300 is installed, drive shaft 408 extends through transmission housing 340 and engages with latch assembly 360. Sleeve 359 on side plate 348 is received into opening 363 in handle base 362. Heat stakes 350 are received into and through mounting holes 364-1, 364-2 provided in handle base 362. The free ends of heat stakes 350 would then be melted to secure handle base 362 to transmission housing 340 of pick mechanism 300. Handle 380 is slidably received into handle base 362 opposite to sleeve 359. Latch assembly 360 engages a circumferential groove 411 provided near free end 412 of drive shaft 408 when pick mechanism 300 is installed by a user applying an axial pushing force to handle 380 of latch assembly 360 in a direction toward side plate 348 along axis or centerline 420. Pick mechanism 300 is detached from drive shaft 408 and latch assembly 360 is detached from groove 411 by a user applying an axial pulling force to handle 380 in a direction away from side plate 348 again along axis or centerline 420. No pinching or applying force transverse to drive shaft 308 is required when using latch assembly 360.

Features and operation of latch assembly 360 consisting of handle base 362 and handle 380 will be described with reference to FIGS. 10-15E. Handle base 362 has a first end 362-1 and a second or free end 362-2 and, in one example form, is a generally cylindrical hollow body having a center opening 363 extending between first and second ends 362-1, 362-2. First end 362-1 would be positioned adjacent to side plate 348 of transmission housing 340 and centered about rear opening 356 therein. Mounting holes 364-1, 364-2 extend through the wall of handle base 362 between first and second ends 362-1, 362-2. Mounting hole 364-1 is shown as being circular while mounting hole 364-2 is shown as being oval allowing for adjustment in the positioning of handle base 362 on transmission housing 340. In the example embodiment shown, a heat stake 350 extends through each of mounting holes 364-1, 364-2 and is melted to fasten handle base 362 to transmission housing 340. Other fasteners may be used to mount handle base 362 to transmission housing 340.

Depending from second end 362-2 are two pairs of opposed arms mounted in a cantilevered manner about center opening 363. One pair of opposed arms are first and second guide arms 366, 367. Respective first ends 366-1, 367-1 of guide arms 366, 367 are mounted to second end 362-1 of handle base 362. Guide arms 366, 367 axially extend from handle base 362 substantially parallel to axis 420. Guide arms 366, 367 may be provided with a shallow curved cross section along their lengths. As shown guide arm 366 is curved upwardly and guide arm 367 is curved downwardly. Second ends 366-2, 367-2 may be provided with a chamfer to ease entry of guide arms 366, 367 into handle 380. Although two opposed guide arms 366, 367 are shown, it will be understood that one guide arm may be used.

Figure 11:
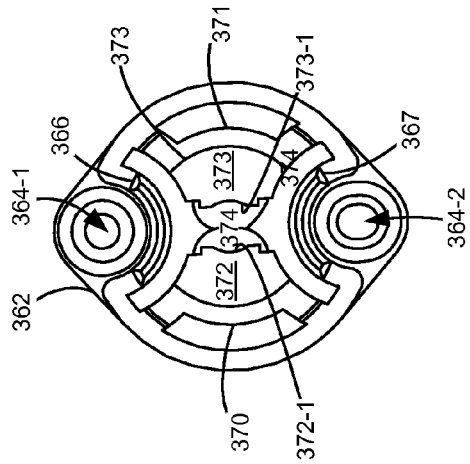
FIG. 11 illustrates an elevational view of the handle base of FIG. 10.
Figure 12:
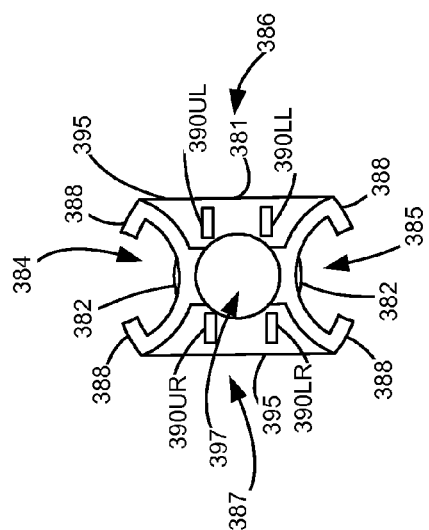
FIG. 12 illustrates an elevational view of the handle of FIG. 10.
Figure 10:
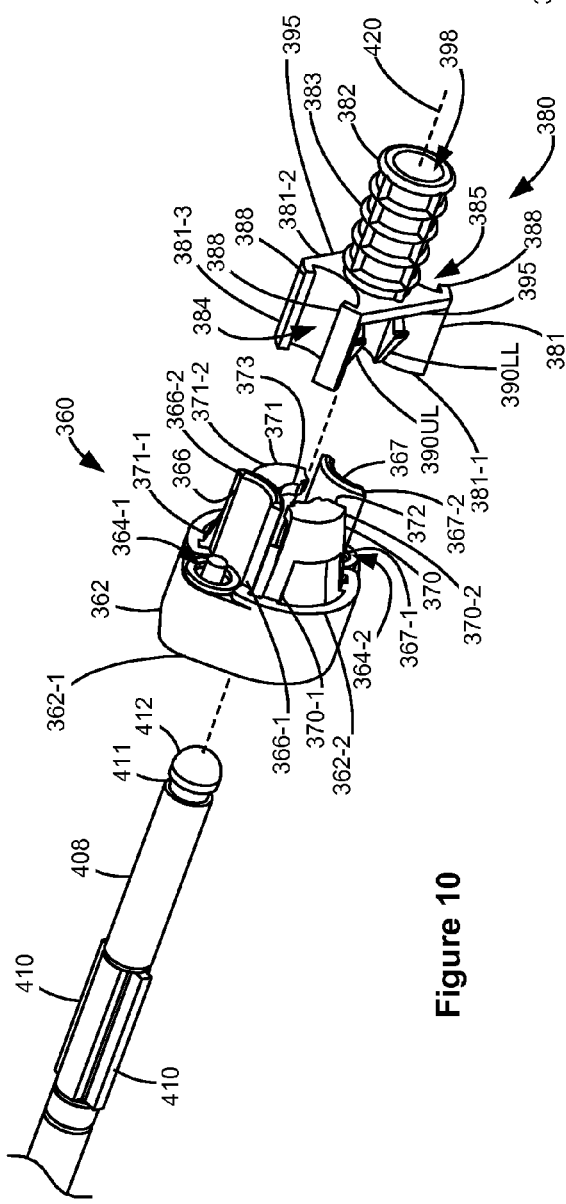
FIG. 10 is an exploded view of the latch assembly with the detachable pick mechanism removed showing a handle base and a handle.

The second pair of opposed arms are first and second latch arms 370, 371. Respective first ends 370-1, 371-1 of latch arms 370, 371 are mounted to second end 362-1 of handle base 362. Latch arms 370, 371 are resilient or flexible, and, in FIGS. 10 -11 are shown in their unflexed or undeflected position. First and second latch arms 370, 371 are slightly shorter than first and second guide arms 366, 367. Second ends 370-2, 371-2 of latch arms 370 have inwardly turned extensions forming first and second catches 372, 373, respectively. Catches 372, 373 may be positioned radially with respect to axis 420 or at a slight angle with respect to axis 420. A slight indentation or shallow channel 372-1, 373-1 may be provided in each respective free end of catches 372, 373. The first and second catches 372, 373 may be abutting or as illustrated may be spaced apart. Latch arms 370, 371 are angled inwardly toward axis 420 so that drive shaft 408 will make contact with first and second catches 372, 373. Notches 374 may be provided at the corners of catches 372, 373. As shown, a notch 374 may be provided at each corner of catches 372, 373. Notches 374, when provided, are formed substantially parallel to axis 420. Guide arms 366, 367 and latch arms 370, 371 axially extend from handle base 362 substantially parallel to axis 420.

Guide arms 366, 367 may also be viewed as being an upper and lower guide arm with latch arms 370, 371 being viewed as left and right latch arms.

Handle 380 has a support body 381 having a first end 381-1 and a second end 381-2. Illustrated support body 381 has a cruciform shape having four channels—a first channel 384, a second channel 385 opposite first channel 384, a third channel 386, and a fourth channel 387 opposite third channel 386. First and second channels 384, 385 are inwardly curved and each channel has flanges 388 along the outer edges thereof which guide and help retain first and second guide arms 366, 367, respectively when inserted therein. First and second channels 384, 385 are shown extending between first and second ends 381-1, 381-2 of support body 381 and are substantially parallel to axis 420. Third and fourth channels 386, 387 are formed by the outer surfaces of first and second channels 384, 385 and have open ends at first end 381-1 of support body 381 and closed ends adjacent second end 381-2 of support body 381. End wall 395 closes the ends of third and fourth channels 386, 387. Center opening 389 extends through support body 381 between first and second ends 381-1, 381-2. Depending axially from second end 381-2 of support body 381 is grip 382. A first end 382-1 of grip 382 abuts second end 381-2. Grip 382 may be provided with one or more circumferential ribs 383 to increase the gripping effectiveness thereof. A center opening 398 is illustrated extending between first end 382-1 and a second end 382-2 and being axially aligned with opening 389 in support body 381. Openings 389, 398 are sized to receive drive shaft 408. Opening 398 may be a through opening or a closed opening as indicated by the grey block shown in FIG. 13B. Opening 398 may be omitted should the length of support body 381 be axially extended, and, whether or not it is provided is a matter of design choice.

Within either or both of third and fourth channels 386, 387 is at least one rail, generally designated 390. As shown third channel 386 has upper and lower right rails 390UR, 390LR that are parallel to one another and to axis 420 and fourth channel 387 has upper and lower left rails 390UL, 390LL similarly positioned. As viewed in FIGS. 10 and 12, upper right and upper left rails 390UR, 390UL form a first opposed rail pair while lower left and lower right rails 390LR, 390LL form as a second opposed rail pair. All four rails 390UR, 390UL, 390LR, 390LL begin adjacent first end 381-1 of support body 381 and end at a predetermined position that is axially spaced apart from end wall 395 forming four dwell gaps 394 therebetween. The width of dwell gaps 394 is sized to receive first and second catches 372, 373 therein.

Figures 13A, 13B, 14A, 14B:
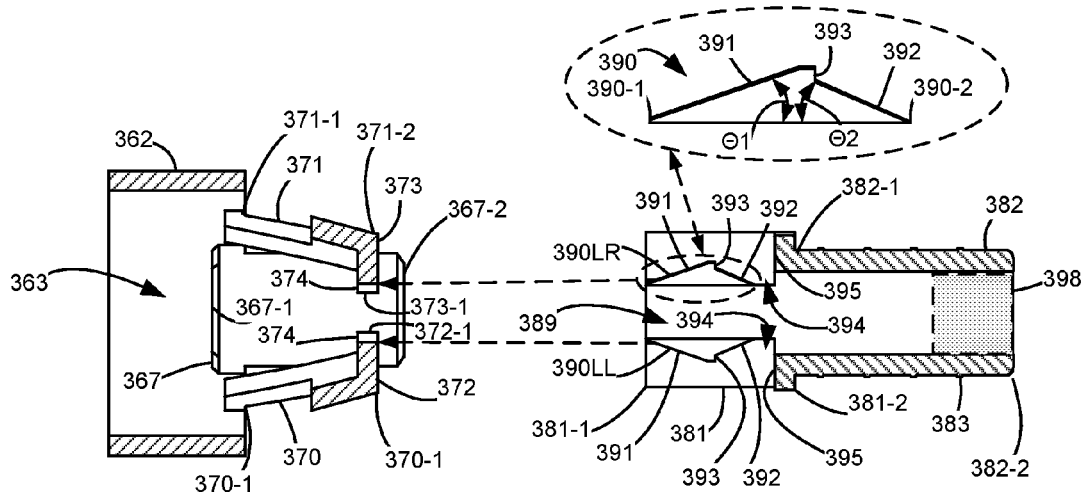

In FIG. 13B an inset showing an enlarged rail 390 is provided. Each rail 390 has a generally triangular profile formed by two camming surfaces or ramps 391, 392 which form the legs of the triangle with the base formed by support body 381. Ramp 391 will be referred to as the outer ramp while ramp 392 will be referred to as the inner ramp as it is closed to end wall 395. Outer ramp 391 is at a first acute angle θ1 with respect to support body 381 while inner ramp 392 is at a second acute angle θ2. As shown θ1>θ2. Because of this difference in the angles of the outer and inner ramps 391, 392 a step 393 is formed between proximate to where the two ramps intersect at the apex of the triangle at approximately at the midpoint of rail 390. As one of skill in the art would recognize step 393 may also be created between outer and inner ramps 391, 392 should θ2>θ1. Angles θ1 and θ2 may each be in the range of about 45 degrees. Angle θ1 is empirically determined to allow for the insertion of handle 380 in handle base 362 to occur easily without much force being needed. Angle θ2 is an empirically determined so that latch arms 370, 371 may easily slide up and down inner ramps 392 while allowing for a spring effect bounce of latch arms 370, 371 to occur when they snap down into dwell gaps respective 394.

Latch assembly 360 is assembled by axially inserting handle 380 onto handle base 362 as shown in FIGS. 14A-14B. Because of their longer length, first and second guide arms 366, 367 initially enter into first and second channels 384, 385, respectively. This aligns notches 374 in first and second catches 372, 373 with their respective rails 390. Thereafter, first and second latch arms 370, 371 are received into third and fourth channels 386, 387 and rails 390 therein are received between respective notches 374 in first and second catches 372, 373. As insertion of handle 380 continues, first and second catches ride up respective outer ramps 391 separating and flexing first and second latch arms 370, 371 and first and second catches 372, 373 as indicated by the small arrows shown on first and second catches 372, 373 in FIG. 14A. As handle 380 insertion continues, first and second catches 372, 373 step down from outer ramps 391 over respective steps 393 and fall down onto respective inner ramps 392 and travel downward toward respective dwell gaps 394. When handle 380 is completely installed, first and second catches 372, 373 snap into respective dwell gaps 394 and first and second latch arms 370, 371 will return to their unflexed or undeflected positions.

Figure 15A:
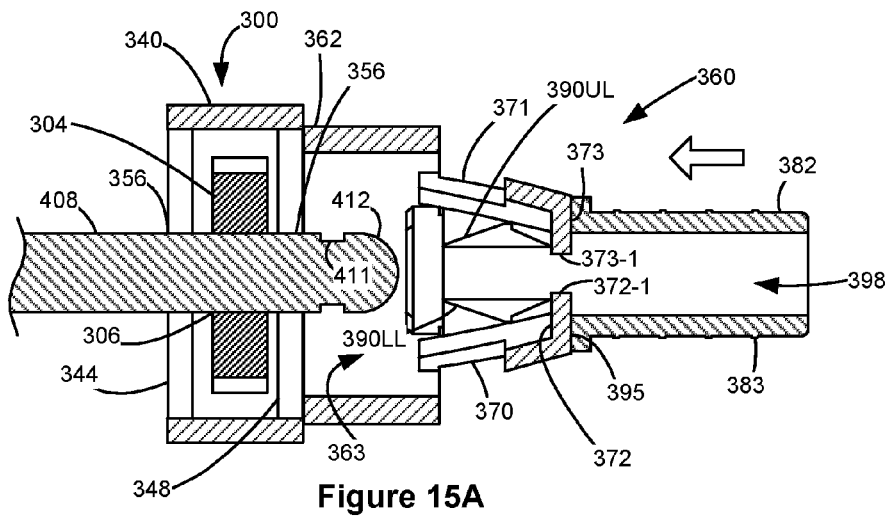
Figure 15B:
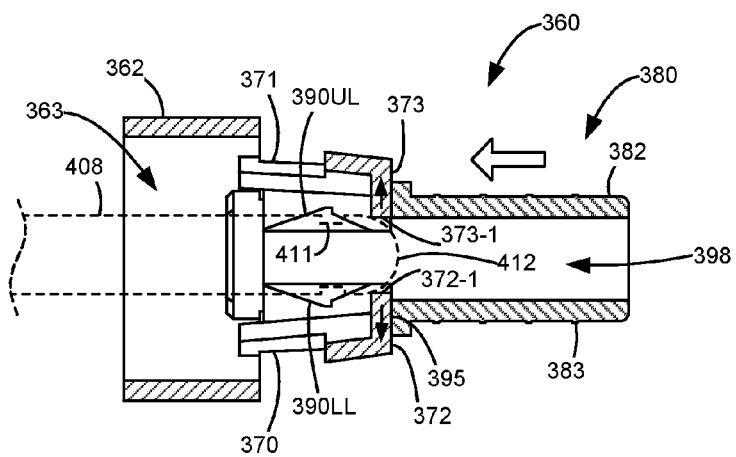
Figure 15C:
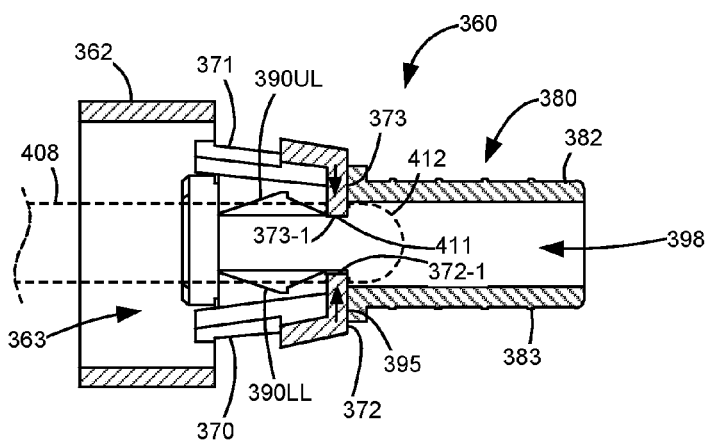
Figure 15D:
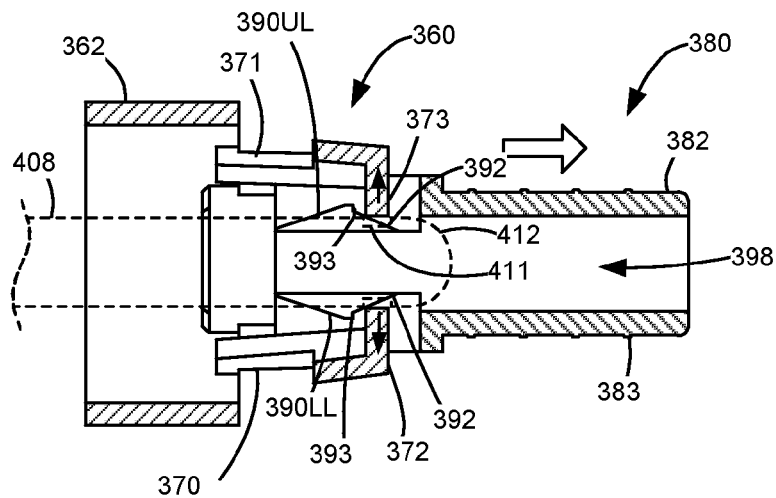

Operation of latch assembly 360 is illustrated in FIGS. 15A-15E. In FIG. 15A, handle base 362 is attached to side plate 348 of transmission housing 340. Handle 380 is slidably installed in handle base 362. Latch assembly 360 and pick mechanism 300 are being axially moved toward the left side of the figure as indicated by the hollow arrow. Drive shaft 408 is shown passing through transmission housing 340 and drive shaft gear 304 via openings 356, 307, respectively and into opening 363 of handle base 362. Shaft end 412 has not yet entered between opposed first and second latch arms 370, 371. In FIGS. 15B-15E transmission housing 340, drive shaft gear 304 and heat stakes 350 are not shown and drive shaft 408 is shown in dashed line for purposes of clarity. In FIG. 15B shaft end 412 has encountered first and second catches 372, 373 causing them to separate and deflect in the direction indicated by the small vertical arrows. In FIG. 15C first and second catches 372, 373 have snapped into groove 411 which can be felt by a user pushing on handle 380. First and second latch catch indentations 372-1, 373-1, if provided, allow first and second catches 372, 373 to better grip drive shaft 408. Pick mechanism 300 is now installed on drive shaft 408. To remove pick mechanism 300, handle 380 is pulled in an axial direction as indicated by the hollow arrow shown in FIG. 15D (toward the right side of the figure). The pulling force causes first and second latch arms 370, 371 to deflect away from drive shaft 408 and first and second catches 372, 373 to exit groove 411 and ride up inner ramps 392. First and second latch arms 370, 371 continue their outward deflection and, at a position at or just before step 393, first and second catches will be clear of groove 411. As handle 380 is continued to be pulled, first and second catches 372, 373 bump into steps 393 of rails 390, which can also be felt by a user indicating that pick mechanism 300 has been released from drive shaft 408. The encounters with steps 393 stop further separation of first and second latch arms 370, 371 and first and second catches 372, 373 allowing pick mechanism 300 to be pulled off of drive shaft 408 and preventing separation of handle 380 from handle base 362.

Figure 15E:
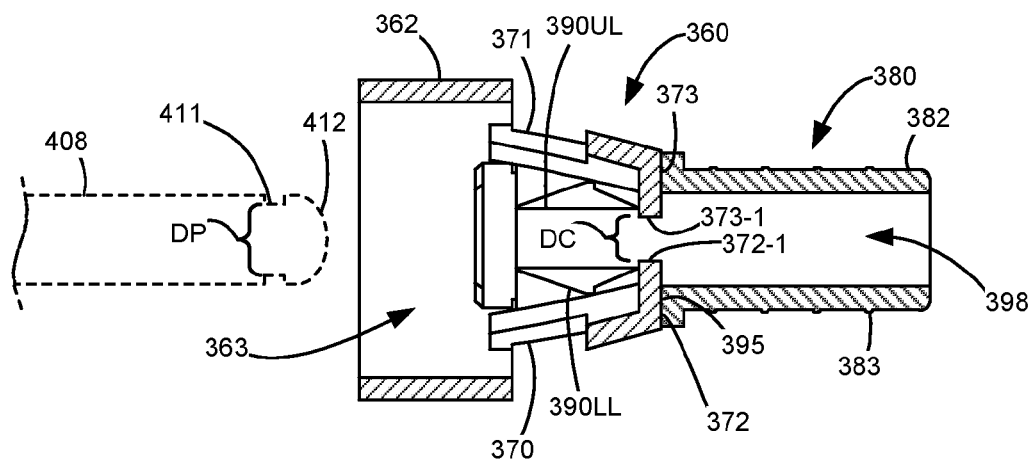
Figure 16:
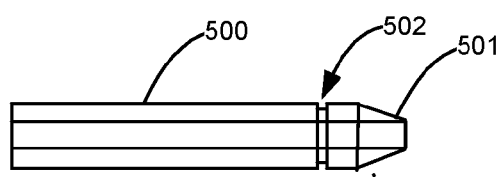
FIG. 16 illustrates an alternate form of a post useable with the latch assembly.

Shown in FIG. 15E is a separation distance DC between first and second catches 372, 373 with first and second latch arms 370, 371 in their undeflected position and a distance DP representing the depth of groove 411. The distance DC may be less or equal to the distance DP to ensure engagement of first and second catches 372, 373, with groove 411. FIG. 16 illustrates an alternative embodiment for a post 500 useable with latch assembly 360. Post 500 is polygonal with a planar tapered camming surface at free end 501 and a circumferential groove 502.

Plastic, such as acrylonitrile butadiene styrene (ABS) or polyoxymethylene (POM), may be used for the majority of components in pick mechanism 300 and for latch assembly 360. Pick tires 323 are fabricated from elastomer based materials to provide gripping forces against media M. Gears 304, 306, 310 used in drive transmission 302 may be made of POM.

The latch assembly as described may be used to attach two members together. Such a latch assembly includes a post, a handle base and handle. The post has a first end mountable to a first member in a cantilever manner and a free end having a circumferential groove inboard thereof (as illustrated by the mounting of drive shaft 408). The handle base is mountable to a second member, the second member and handle base each having respective aligned openings for receiving the free end of the post therethrough. The handle would be slidably inserted and retained in the handle base. The handle and handle base would have the features as previously described for handle base 362 and handle 380.

The foregoing descriptions of example embodiments of the present disclosure have been presented for purposes of illustration. It is not intended to be exhaustive or to limit the present disclosure to the precise steps and/or forms disclosed, and obviously many modifications and variations are possible in light of the above description. It is intended that the scope of the present disclosure be defined by the claims appended hereto.

What is claimed is:

1. A detachable pick mechanism, comprising:
 a drive transmission having a drive shaft gear operatively connected to a pick axle gear, the drive shaft gear slidably engageable onto a cantilevered drive shaft extending from a housing;
 a pick axle having a pick wheel mounted at each end, the pick axle operatively connected to the pick axle gear for rotating the pick wheels; and
 a transmission housing having:
  a top, a bottom, and a first side defining a cavity therein for containing the drive transmission and a side plate mounted over the cavity opposite the first side for enclosing the drive transmission; and
  an opening in a front portion and in a rear portion of the transmission housing through which the pick axle and drive shaft, respectively, pass, the front portion dimensioned so that the surface of the at least one pick wheel extends beyond the top and the bottom of the front portion;
 and,
 a latch assembly mounted on one of the first side and the side plate for rotatably engaging a groove in the cantilevered drive shaft to axially position the pick mechanism on the drive shaft, the latch assembly comprising:
  a handle base mounted on one of the first side and the side plate of the transmission housing having an opening therethrough for receiving the free end of the drive shaft therein, the handle base including:
   a pair of opposed guide arms; and
   a pair of opposed resilient latch arms, the pairs of opposed resilient latch arms and opposed guide arms depending from a same side of the handle base and being axially aligned with the opening in the handle base with each latch arm having a catch at a free end thereof;
  and,
  a handle slidably retained in the handle base and axially movable within the handle base, the handle including:
   a support body having a first end and a second end, the support body having an axial opening extending between the first and second ends and a pair of opposed channels axially extending along an outer surface of the support body from the first end and aligned with the pair of opposed guide arms and receiving therein a corresponding guide arm;
   a grip axially depending from a second end of the support body;
   an end wall radially extending from the support body and positioned adjacent to the second end thereof; and
   at least two opposed rails axially positioned between the first and second ends of the support body and aligned with a respective catch, each rail having:
    a first and a second end and extending along the outer surface of the support body from the first end of the support body toward the second end of the support body, the second ends of the at least two opposed rails being spaced apart from the end wall and forming a respective dwell gap therebetween sized to receive therethrough the respective catches of the pair of opposed resilient latch arms;
    an inner ramp having a bottom beginning adjacent to the second end of the rail and raising at a predetermined first acute angle; and
    an outer ramp having a bottom beginning adjacent to first end of the rail and raising at a predetermined second acute angle with the first and second catches being moveable along respective outer and inner ramps,
 wherein, during mounting of the pick mechanism onto the drive shaft using an axial pushing force applied to the handle, the free end of the drive shaft initially separates the catches and deflects the pair of opposed resilient latch arms with the catches subsequently engaging the groove on the drive shaft with the pair of opposed resilient latch arms returning to a less deflected position thereby rotatably latching the pick mechanism to the drive shaft, and, during dismounting of the pick mechanism from the drive shaft using an axial pulling force applied to the handle, the catches slide up the respective inner ramps of the at least two opposed rails and disengage from the groove in the drive shaft allowing the pick mechanism to axially slide off of the free end of drive shaft.

2. The detachable pick mechanism of claim 1, wherein the drive shaft gear has a center opening having a plurality of axial grooves engageable with a at least one radial spline on the drive shaft.

3. The detachable pick mechanism of claim 1, wherein, for each rail, a step is formed between respective upper ends of the inner and outer ramps, the step limiting axial movement of the pair of opposed resilient latch arms within the handle base when an axial pulling force is applied to the handle.

4. The detachable pick mechanism of claim 3, wherein the first acute angle is less than the second acute angle.

5. The detachable pick mechanism of claim 1, wherein, with the pair of opposed resilient latch arms being in an undeflected position, the respective catches extend through respective dwell gaps into the opening in the handle base.

6. The detachable pick mechanism of claim 5, wherein the catches are separated by a distance that is less than or equal to a distance of an inner diameter of the groove.

7. The detachable pick mechanism of claim 1, wherein during installation of the handle into the handle base, the catches initially engage respective outer ramps of the at least two opposed rails and the pair of opposed resilient latch arms are increasingly separated as they travel therealong, and, as installation of the handle continues, the catches transfer to the respective inner ramps of the at least two opposed rails with the pair of opposed resilient latch arms being decreasingly separated until the catches enter the respective dwell gaps and the pair of opposed resilient latch arms return to a substantially undeflected position.

8. The detachable pick mechanism of claim 1, wherein an aligned end of each catch has an axial notch therein forming a pair of opposed notches aligned with the respective first ends of the at least two opposed rails.

9. The detachable pick mechanism of claim 1, wherein, the at least two opposed rails further comprise two pairs of opposed rails with each end of each catch having an axial notch therein forming two pairs of opposed notches between the respective catches with one pair of opposed rails axially aligned with a corresponding pair of opposed notches in the catches.

* * * * *